US008346664B1

(12) United States Patent
Klieman et al.

(10) Patent No.: US 8,346,664 B1
(45) Date of Patent: Jan. 1, 2013

(54) METHOD AND SYSTEM FOR MODIFYING FINANCIAL TRANSACTION CATEGORIZATION LISTS BASED ON INPUT FROM MULTIPLE USERS

(75) Inventors: Michael S. Klieman, Belmont, CA (US); Joseph William Wells, III, San Carlos, CA (US); Kevin M. Reeth, II, San Jose, CA (US); Jeffrey Zimmerman, St. Louis, MO (US)

(73) Assignee: Intuit Inc., Mountain View, CA (US)

( * ) Notice: Subject to any disclaimer, the term of this patent is extended or adjusted under 35 U.S.C. 154(b) by 1079 days.

(21) Appl. No.: 12/265,021

(22) Filed: Nov. 5, 2008

(51) Int. Cl.
G06Q 40/00 (2012.01)

(52) U.S. Cl. ........................................................ 705/42

(58) Field of Classification Search ................ 705/1–39; 719/1–318; 726/1–28
See application file for complete search history.

(56) References Cited

U.S. PATENT DOCUMENTS

| | | | |
|---|---|---|---|
| 5,559,313 A | 9/1996 | Claus et al. | |
| 5,754,938 A | 5/1998 | Herz et al. | |
| 6,363,488 B1 | 3/2002 | Ginter et al. | |
| 7,403,906 B2 | 7/2008 | Coleman | |
| 7,437,330 B1 | 10/2008 | Robinson et al. | |
| 7,558,777 B1 | 7/2009 | Santos | |
| 2001/0027408 A1 | 10/2001 | Nakisa | |
| 2002/0107809 A1 | 8/2002 | Biddle et al. | |
| 2002/0111725 A1 | 8/2002 | Burge | |
| 2002/0173986 A1 | 11/2002 | Lehew et al. | |
| 2002/0198801 A1 | 12/2002 | Dixon et al. | |
| 2003/0009402 A1 | 1/2003 | Mullen et al. | |
| 2003/0120570 A1 | 6/2003 | Dellinger et al. | |
| 2003/0139985 A1 | 7/2003 | Hollar et al. | |
| 2003/0144938 A1 | 7/2003 | Lahre et al. | |
| 2003/0177076 A1 | 9/2003 | Might et al. | |
| 2003/0222134 A1 | 12/2003 | Boyd | |
| 2004/0024638 A1 | 2/2004 | Restis | |
| 2004/0158360 A1 | 8/2004 | Garland, II et al. | |
| 2005/0015272 A1 | 1/2005 | Wind et al. | |
| 2005/0071262 A1 | 3/2005 | Kobeh et al. | |
| 2005/0080701 A1 | 4/2005 | Tunney et al. | |
| 2005/0125341 A1* | 6/2005 | Miri et al. | 705/39 |
| 2005/0138440 A1 | 6/2005 | Barr et al. | |
| 2006/0101323 A1 | 5/2006 | Satyavolu | |

(Continued)

OTHER PUBLICATIONS

James et al., Closing the delivery gap, 2005, Bain & Company, web, 1-10.*

(Continued)

*Primary Examiner* — Marissa Liu
(74) *Attorney, Agent, or Firm* — McKay and Hodgson, LLP; Philip McKay; Sean P. Lewis (57) ABSTRACT

A system and method for modifying financial transaction categorization lists based on input from multiple users whereby, when a given user of a computing system implemented financial management system modifies their own list of possible categorizations for a given financial transaction, data indicating the given user's modification of the given user's own list of possible categorizations for a given financial transaction is obtained by the computing system implemented financial management system. The obtained data indicating the given user's modification of their own list of possible categorizations for a given financial transaction is then used by the computing system implemented financial management system to create and/or modify a shared list of possible categorizations for a given financial transaction. The shared list of possible categorizations for a given financial transaction is then made available to, and/or used by, a community of users of the computing system implemented financial management system.

2 Claims, 2 Drawing Sheets

U.S. PATENT DOCUMENTS

| | | | |
|---|---|---|---|
| 2006/0212338 | A1 | 9/2006 | Bogle et al. |
| 2006/0242050 | A1 | 10/2006 | Haggerty et al. |
| 2007/0011071 | A1 | 1/2007 | Cuscovitch et al. |
| 2007/0055597 | A1 | 3/2007 | Patel et al. |
| 2007/0088641 | A1 | 4/2007 | Aaron et al. |
| 2007/0118394 | A1 | 5/2007 | Cahoon |
| 2007/0136177 | A1 | 6/2007 | Reeth et al. |
| 2007/0192165 | A1 | 8/2007 | Haggerty et al. |
| 2007/0265902 | A1 | 11/2007 | Brennen et al. |
| 2008/0065437 | A1 | 3/2008 | Dybvig |
| 2008/0195451 | A1 | 8/2008 | Abram |
| 2010/0268640 | A1 | 10/2010 | Kuyper et al. |

OTHER PUBLICATIONS

Getting Started with Quicken® 2007, copyright 2006, Chapters 1 and 2.

Getting Started with Quicken® Home & Business, copyright 2006, Chapter 2.

Del Favero et al., "Method and System for Predictive Event Budgeting Based on Financial Data from Similarly Situated Consumers", U.S. Appl. No. 12/058,014, filed Mar. 28, 2008.

Rukonic et al., "Method and System for Automatic Categorization of Financial Transaction Data Based on Financial Data From Similarly Situated Users", U.S. Appl. No. 12/059,372, filed Mar. 21, 2008.

Friel et al., "Method and System for Automatic Categorization of Financial Transactions as Business Financial Transactions or Personal Financial Transactions", U.S. Appl. No. 12/108,772, filed Apr. 24, 2008.

Maniago et al., "Method and System for Providing Qualified Offers, Advertising, and Advice to Consumers Based on the Consumers' Financial Profile Data and History," U.S. Appl. No. 13/269,444, filed Oct. 7, 2011.

Del Favero et al., "Method and System for Predictive Event Budgeting Based on Financial Data From Similarly Situated Consumers," U.S. Appl. No. 13/280,817, filed Oct. 25, 2011.

\* cited by examiner

METHOD AND SYSTEM FOR MODIFYING FINANCIAL TRANSACTION CATEGORIZATION LISTS BASED ON INPUT FROM MULTIPLE USERS

BACKGROUND

Currently, various computing system implemented financial management systems are available including, but not limited to: computing system implemented personal and small business financial management systems; computing system implemented tax preparation systems; computing system implemented business accounting systems; and computing system implemented medical expense management systems; as well as various other data driven financial management systems, as discussed herein, and/or known in the art at the time of filing, and/or as developed after the time of filing.

Computing system implemented financial management systems typically help users manage their finances by providing a centralized interface with banks, credit card companies, and other various financial institutions, for electronically identifying and categorizing financial transactions associated with the user. Currently, computing system implemented financial management systems typically obtain electronic transaction based data, such as payee, payment amount, date, etc. via communication with banks, credit card providers, or other financial institutions, using electronic data transfer systems such as the Open Financial Exchange (OFX) specification, or various other systems for transferring financial transaction data.

The ability to correctly identify and categorize specific financial transactions is often a central feature of a computing system implemented financial management system. Currently, the data necessary to identify and categorize specific types of financial transactions typically comes from the users of the computing system implemented financial management system and then the input from a given user is used to customize and/or modify the categorization features of the computing system implemented financial management system for that given user in isolation from other users.

For instance, using some currently available computing system implemented financial management systems, the electronic transaction based information, such as payee, payment amount, date, etc. associated with a given financial transaction is used to identify the given financial transaction as a given type of financial transaction. In many instances, a list of possible categorizations for the given type of financial transaction is then associated with the given financial transaction based on the given financial transaction being of the given type of financial transaction. In some instances, the list of possible categorizations for a given financial transaction at least initially, is provided by the computing system implemented financial management system, typically based on relatively generalized data and/or parameters. For instance, in some cases, the initial list of possible categorizations for a given financial transaction provided by the computing system implemented financial management system is pre-defined statically based on Standard Industrial Classification (SIC) codes, or similar non-user specific mechanisms. Typically, the list of possible categorizations for a given financial transaction is presented to the user in the form of a pull-down menu associated with a display of the data representing a given financial transaction. The list of possible categorizations often includes two or more possible categorizations for the given financial transaction and/or a default categorization for the given financial transaction. Typically, the user then selects one of the categories in the list of possible categorizations as the category to be applied to the given financial transaction, or the default categorization is applied.

In some instances, the user can modify the specific list of possible categorizations for a given financial transaction, including the default categorization, which is applied for the given user. In some instances, the list of possible categorizations for a given financial transaction is modified for the given user based on manual and/or semi-manual user input, such as: the user consistently selecting one of the categories in the list of possible categorizations as the category to be applied to a given type of financial transaction; or by the user manually adding to, and/or modifying, the list of possible categorizations. In some instances, the list of possible categorizations for a given financial transaction is presented to the given user in an order, and/or with a default categorization, customized to the given user's previous categorizations, and/or as determined by the frequency with which the given user historically has categorized financial transactions of the given financial transaction type, and/or similar financial transaction type. As noted, typically, the modified list of possible categorizations associated with a given financial transaction is applied only to the given user's implementation of the computing system implemented financial management system.

In some instances, once a given user has categorized a given type of financial transaction at least a defined minimum number of times consistently, then this categorization becomes the default categorization and the computing system implemented financial management system then automatically categorizes future financial transactions of the given type in accordance with the given user's historical categorization of financial transactions of the given type.

While currently available methods for providing, and/or modifying, the list of possible categorizations for a given financial transaction are useful, these currently available methods are also typically of limited scope. This is because, as noted above, currently available methods for providing, and/or modifying, the list of possible categorizations for a given financial transaction are directly tied to a given users input and are typically only available to, and/or used by, the given user. Consequently, currently available methods for providing, and/or modifying, the list of possible categorizations for a given financial transaction is currently created on a user-by-user basis, and used by a given user in isolation from other users.

SUMMARY

In accordance with one embodiment, a system and method for modifying financial transaction categorization lists based on input from multiple users includes a process for modifying financial transaction categorization lists based on input from multiple users whereby, when a given user of a computing system implemented financial management system modifies their own list of possible categorizations for a given financial transaction, data indicating the given user's modification of the given user's own list of possible categorizations for a given financial transaction is obtained by the computing system implemented financial management system. In one embodiment, the obtained data indicating the given user's modification of their own list of possible categorizations for a given financial transaction is then used by the computing system implemented financial management system to create and/or modify a shared list of possible categorizations for a given financial transaction. In one embodiment, the shared list of possible categorizations for a given financial transaction is then made available to, and/or used by, a community of users of the computing system implemented financial management system.

In one embodiment, the computing system implemented financial management system can be, but is not limited to: a computing system implemented personal and small business financial management system; computing system implemented on-line banking system and/or webpage; a computing system implemented tax preparation system; a computing system implemented business accounting system; a computing system implemented medical expense management system; and/or any other data driven financial management system, as discussed herein, and/or known in the art at the time of filing, and/or as developed after the time of filing.

In one embodiment, the given user creates and/or modifies the given user's own list of possible categorizations for a given financial transaction. In one embodiment, the given user creates the given user's own list of possible categorizations, and/or the default categorization, for the given financial transaction. In one embodiment, the given user modifies an initial list of possible categorizations for a given financial transaction provided by the computing system implemented financial management system. In one embodiment, the initial list of possible categorizations for a given financial transaction provided by the computing system implemented financial management system is modified based on manual and/or semi-manual user input, such as: the user consistently selecting one of the categories in the list of possible categorizations as the category to be applied to a given type of financial transaction; or by the user manually adding to, and/or modifying, the list of possible categorizations. In one embodiment, the given user's own list of possible categorizations for a given financial transaction is modified such that the possible categorizations for a given financial transaction are presented in an order, and/or with a default categorization, customized to the given user's previous categorizations, and/or as determined by the frequency with which the given user historically has categorized financial transactions of the given financial transaction type, and/or similar financial transaction type.

In one embodiment, once the given user of the computing system implemented financial management system creates and/or modifies their own list of possible categorizations for a given financial transaction, by whatever means, data indicating the given user's own list of possible categorizations for a given financial transaction, and/or modifications of the given user's own list of possible categorizations for a given financial transaction, is provided to the computing system implemented financial management system.

In one embodiment, data indicating multiple users' lists of possible categorizations for a given financial transaction, and/or modifications of the multiple users' lists of possible categorizations for a given financial transaction, is provided to the computing system implemented financial management system.

In one embodiment, the data indicating multiple users' lists of possible categorizations for a given financial transaction, and/or modifications of the multiple users' lists of possible categorizations for a given financial transaction, including the given user's list of possible categorizations for a given financial transaction, and/or modifications of the given user's list of possible categorizations for a given financial transaction, is used by the computing system implemented financial management system to create and/or modify a shared list of possible categorizations for a given financial transaction.

In one embodiment, the shared list of possible categorizations for a given financial transaction is created according to one or more frequency and segmentation based rules applied to all the multiple users' lists of possible categorizations for a given financial transaction, and/or modifications of the multiple users' lists of possible categorizations for a given financial transaction, including the given user's list of possible categorizations for a given financial transaction, and/or modifications of the given user's list of possible categorizations for a given financial transaction.

In one embodiment, the one or more frequency and segmentation based rules include, but are not limited to, frequency rules whereby a default categorization for a given financial transaction on the shared list of possible categorizations is applied to the given financial transaction based on the most frequently applied categorization of the given financial transaction in all the multiple users' lists of possible categorizations for a given financial transaction.

In one embodiment, the one or more frequency and segmentation based rules include, but are not limited to, frequency rules whereby the order in which one or more possible categorizations for a given financial transaction on the shared list of possible categorizations for a given financial transaction are presented to a user is determined based on the frequency that the one or more categorizations are applied to the given financial transaction in all the multiple users' lists of possible categorizations for a given financial transaction.

In one embodiment, the one or more frequency and segmentation based rules include, but are not limited to, segmentation rules for creating filtered shared lists of possible categorizations for a given financial transaction that are based on lists of possible categorizations for a given financial transaction, and/or modifications of the lists of possible categorizations for a given financial transaction, from users' having one or more defined attributes. In one embodiment, the one or more defined attributes include, but are not limited to, one or more of the following: a defined income being associated with the user; a defined location being associated with the user; a defined profession being associated with the user; one or more defined spending habits being associated with the user; a defined marital status being associated with the user; a defined number of dependents being associated with the user; and/or any other attribute associated with a user that is typically ascertainable from the data available to the computing system implemented financial management system.

In one embodiment, the one or more segmentation rules for creating filtered shared lists of possible categorizations for a given financial transaction are used to provide a given user filtered shared lists of possible categorizations for a given financial transaction that are based on data from users that are most like the given user and/or have one or more attributes of importance to the given user.

In one embodiment, the community of multiple users of the computing system implemented financial management system are provided access to the data representing the shared list of possible categorizations for a given financial transaction through the computing system implemented financial management system.

In one embodiment, data representing the shared list of possible categorizations for a given financial transaction is stored in a shared list of possible categorizations database. In one embodiment, a community of multiple users of the computing system implemented financial management system is then provided access to the shared list of possible categorizations for a given financial transaction by providing the community of multiple users access to the shared list of possible categorizations database.

In one embodiment, the community of multiple users of the computing system implemented financial management system are provided access to the data representing the shared list of possible categorizations for a given financial transaction via a peer-to-peer network and/or other data sharing/access system.

In one embodiment, the community of multiple users of the computing system implemented financial management system are provided access to the data representing the shared list of possible categorizations for a given financial transaction through a network of computing systems and/or server systems that is comprised of multiple different computers, wireless devices, cellular telephones, digital telephones, two-way pagers, personal digital assistants, server computer systems, or any desired combination of these devices, that are interconnected using a network. In some embodiments, the network can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In one embodiment, the community of multiple users of the computing system implemented financial management system are provided access to the data representing the shared list of possible categorizations for a given financial transaction by any method, apparatus, process or mechanism for transferring and/or accessing data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, as discussed herein, and/or known at the time of filing, and/or as developed after the time of filing.

In one embodiment, even if a given user accesses, and/or uses, the shared list of possible categorizations for a given financial transaction, the given user's own list of possible categorizations for a given financial transaction remains unaltered. Consequently, the user can benefit from the shared list of possible categorizations for a given financial transaction without losing data associated with his or her own list of possible categorizations for a given financial transaction.

Using, the process for modifying financial transaction categorization lists based on input from multiple users disclosed herein, the lists of possible categorizations for a given financial transaction, and/or modifications to the lists of possible categorizations for a given financial transaction, that were previously tied to a given user, and only used by the given user, are now shared, and/or used to create a shared list of possible categorizations for a given financial transaction that is accessible, and usable, by multiple users. Consequently, using the process for modifying financial transaction categorization lists based on input from multiple users disclosed herein, multiple user's input is used to provide a more comprehensive list of possible categorizations for a given financial transaction, with fewer no-default category cases, and a more accurate list of possible categorizations for a given financial transaction category list.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for modifying financial transaction categorization lists based on input from multiple users includes a process for modifying financial transaction categorization lists based on input from multiple users whereby, when a given user of a computing system implemented financial management system modifies their own list of possible categorizations for a given financial transaction, data indicating the given user's modification of the given user's own list of possible categorizations for a given financial transaction is obtained by the computing system implemented financial management system. In one embodiment, the obtained data indicating the given user's modification of their own list of possible categorizations for a given financial transaction is then used by the computing system implemented financial management system to create and/or modify a shared list of possible categorizations for a given financial transaction. In one embodiment, the shared list of possible categorizations for a given financial transaction is then made available to, and/or used by, a community of users of the computing system implemented financial management system.

Hardware System Architecture

FIG. 1 is a block diagram of an exemplary hardware architecture for implementing one embodiment of a system and method for modifying financial transaction categorization lists based on input from multiple users, such as exemplary process 200 (FIG. 2) discussed herein, that, returning to FIG. 1, includes: a computing system 100, e.g., a first computing system; a computing system 150, e.g., a second computing system; a server system 120; and databases 170, 171 and 172, all operatively coupled by a network 130.

Figure 1:
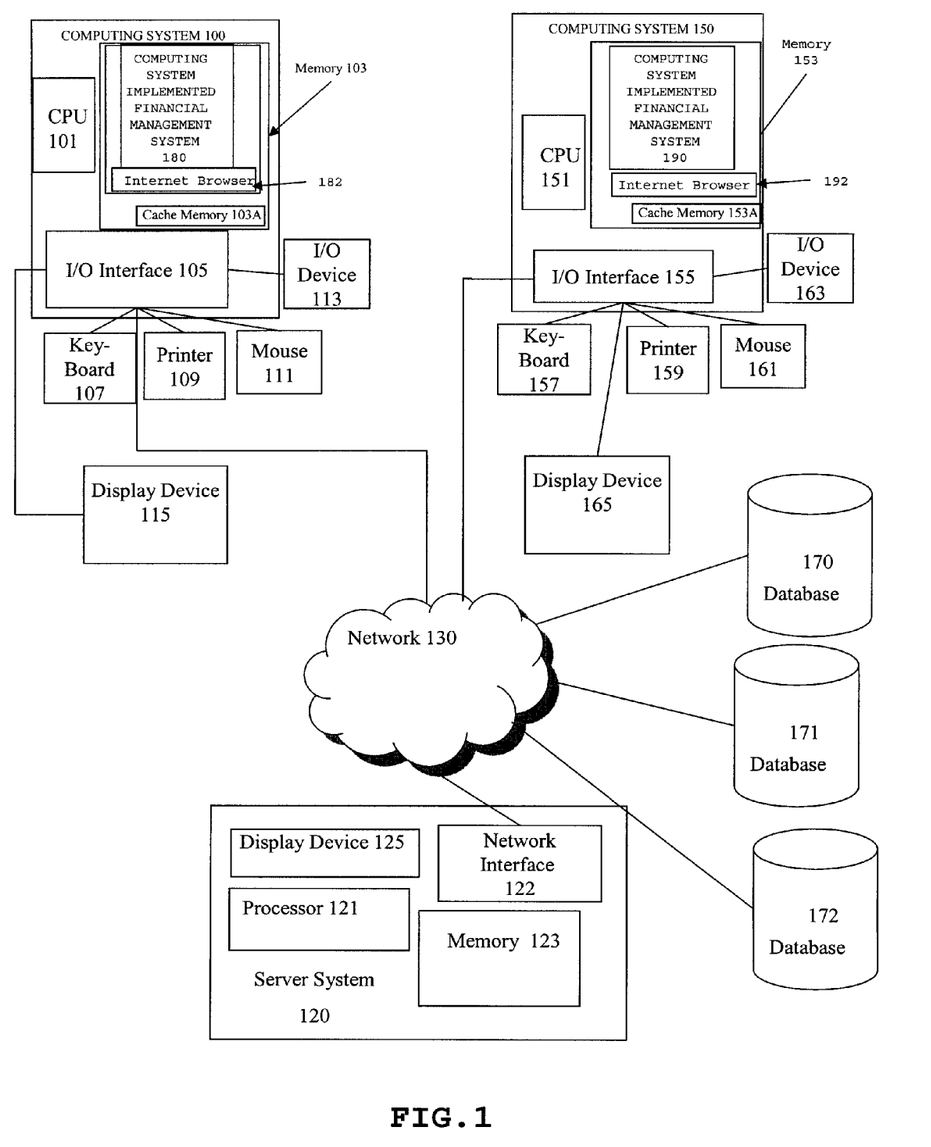
FIG. 1 is a block diagram of an exemplary hardware architecture for implementing one embodiment.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180 such as any computing system implemented financial management system discussed herein, known in the art at the time of filing, and/or as developed thereafter. In one embodiment, computing system implemented financial management system 180 is stored, in whole, or in part, in memory system 103, and is used by, or includes, or is accessed by, a process for modifying financial transaction categorization lists based on input from multiple users (not shown in FIG. 1; see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for modifying financial transaction categorization lists based on input from multiple users and/or a computing system implemented financial management system are entered, in whole, or in part, into computing system 100 via I/O device 113, such as from a CD, DVD, floppy disk, portable hard drive, memory stick, download site, or other medium and/or computer program product as discussed herein.

In one embodiment, computing system 100 also includes an Internet browser capability 182 that, in one embodiment, includes a search engine (not shown) and is stored, in whole, or in part in memory 103.

In one embodiment, data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction, is entered and/or stored, in whole, or in part, in memory system 103, and is used by, or is accessed by, a process for modifying financial transaction categorization lists based on input from multiple users and/or one or more computing system implemented financial management systems.

In one embodiment, computing system 100 is a computing system that is accessible by the one or more users. In one embodiment, computing system 100 is used, and/or accessible, by another computing system, such as computing system 150 (discussed below).

In one embodiment, computing system 100 is used, controlled, and/or accessible by, a provider of and/or a computing system implemented financial management system and data representing all, or part, of general business data and/or financial data and/or tax data associated with one or more users is stored in computing system 100.

Computing system 100 can be any computing system as discussed herein and/or as known in the art at the time of filing and/or as developed thereafter, that includes components that can execute all, or part, of a process for modifying financial transaction categorization lists based on input from multiple users, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented financial management system 190, such as any computing system implemented financial management system discussed herein, and/or known in the art at the time of filing, and/or as developed thereafter. In one embodiment, computing system implemented financial management system 190 is stored, in whole, or in part, in memory system 153, and is used by, or includes, or is accessed by, a process for modifying financial transaction categorization lists based on input from multiple users.

In one embodiment, data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction, is entered and/or stored, in whole, or in part, in memory system 153, and is used by, or includes, or is accessed by, a process for modifying financial transaction categorization lists based on input from multiple users.

In one embodiment, computing system 150 is a computing system accessible by one or more users. In one embodiment, computing system 150 is used, and/or accessible, by another computing system, such as computing system 100.

Computing system 150 can be any computing system as discussed herein and/or as known in the art at the time of filing and/or as developed thereafter, that includes components that can execute all, or part, of a process for modifying financial transaction categorization lists based on input from multiple users, and/or a computing system implemented financial management system, in accordance with at least one of the embodiments as described herein.

Also shown in FIG. 1 are exemplary databases 170, 171, and 172. In one embodiment, databases 170, 171, and 172 are data storage devices, designated server systems or computing systems, or designated portions of one or more server systems or computing systems, such as computing systems 100, 150 and server system 120, or distributed databases, or external and/or portable hard drives. In one embodiment, databases 170, 171, and 172 are dedicated mass storage devices implemented in software, hardware, or a combination of hardware and software. In one embodiment, databases 170, 171, and 172 include a web-based function. As discussed in more detail below, in one embodiment, databases 170, 171, and 172 contain data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction.

In one embodiment, the data stored, in whole, or in part, in databases 170, 171, and 172, is used by, or is accessed by, a process for modifying financial transaction categorization lists based on input from multiple users. In one embodiment, databases 170, 171, and 172 are accessible by one or more users. In one embodiment, databases 170, 171, and 172 are used, and/or accessible, by a computing system, such as computing systems 100 and/or 150, and/or a server system, such as sever system 120 (discussed below).

In one embodiment, databases 170, 171, and 172 are used, controlled, and/or accessible by, a provider of, and/or, a computing system implemented financial management system.

In one embodiment, computing systems 100 and 150, and databases 170, 171, and 172, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, the data stored, in whole, or in part, in server system 120, is used by, or is accessed by, a process for modifying financial transaction categorization lists based on input from multiple users. In one embodiment, server system 120 is accessible by one or more users. In one embodiment, server system 120 is used, and/or accessible, by a computing system, such as computing systems 100 and/or 150, and/or one or more databases, such as databases 170, 171, and 172. In one embodiment, server system 120 is used, controlled, and/or accessible by, a provider of, and/or, a computing system implemented financial management system.

In one embodiment, server system 120 includes data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction.

Network 130 can be any network or network system as discussed herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, databases 170, 171, and 172, server system 120, and their respective components are shown for illustrative purposes only and that other architectures with more or fewer components can implement, and benefit from, the invention. Moreover, one or more components of computing system 100, computing system 150, databases 170, 171, and 172, and server system 120 may be located remotely from their respective system and accessed via network 130. In addition, the particular type of, and configuration of, computing systems 100 and 150, databases 170, 171, and 172, and server system 120 are not relevant.

As discussed in more detail below, in one embodiment, a process for modifying financial transaction categorization lists based on input from multiple users, and/or a computing system implemented financial management system, and/or data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction, is stored, in whole, or in part, in memory system 103 and/or cache memory 103A, of computing system 100, and/or memory system 153 and/or cache memory 153A of computing system 150, and/or in server memory system 123 of server system 120 and/or in databases 170, 171, and 172, and executed on computing system 100 and/or computing system 150. As used herein, a memory refers to a volatile memory, a non-volatile memory, or any combination of the two.

Although a process for modifying financial transaction categorization lists based on input from multiple users, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for modifying financial transaction categorization lists based on input from multiple users and/or a computing system implemented financial management system is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for modifying financial transaction categorization lists based on input from multiple users, and/or a computing system implemented financial management system, and/or data representing one or more users' own lists of possible categorizations for a given financial transaction, and/or data representing one or more users' modifications to their own lists of possible categorizations for a given financial transaction, and/or financial data associated with one or more users, and/or data indicating one or more frequency and/or segmentation rules for creating one or more shared lists of possible categorizations for a given financial transaction, and/or data indicating one or more attributes associated with one or more users, and/or data representing one or more shared lists of possible categorizations for a given financial transaction, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "user" includes, but is not limited to, any party and/or entity that interfaces with, provides information to, and/or to whom information is provided by, a process for modifying financial transaction categorization lists based on input from multiple users, and/or a person and/or entity that interfaces with, provides information to, and/or to whom information is provided by, a process for modifying financial transaction categorization lists based on input from multiple users, and/or a legal guardian of person and/or entity that interfaces with, provides information to, and/or to whom information is provided by, a process for modifying financial transaction categorization lists based on input from multiple users, and/or an authorized agent of any party and/or person and/or entity that interfaces with, provides information to, and/or to whom information is provided by, a process for modifying financial transaction categorization lists based on input from multiple users.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented financial management system" includes, but is not limited to: computing system implemented personal financial management systems, packages, programs, modules, or applications; computing system implemented on-line banking systems, packages, programs, modules, or applications; computing system implemented business systems, packages, programs, modules, or applications; computing system implemented tax preparation systems, packages, programs, modules, or applications; computing system implemented financial institution management systems, packages, programs, modules, or applications; computing system implemented accounting and/or invoicing systems, packages, programs, modules, or applications; computing system implemented business and/or point of sale systems, packages, programs, modules, or applications; computing system implemented on-line banking systems, packages, programs, modules, or applications; computing system implemented credit account management systems, packages, programs, modules, or applications; computing system implemented healthcare management systems, packages, programs, modules, or applications; and/or various other electronic data driven data management systems, packages, programs, modules, or applications, as discussed herein, and/or as known in the art at the time of filing, and/or as developed after the time of filing.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or as known in the art at the time of filing, and/or as developed after the time of filing.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as discussed herein, and/or as known in the art at the time of filing, and/or as developed after the time of filing.

In accordance with one embodiment, a system and method for modifying financial transaction categorization lists based on input from multiple users includes a process for modifying financial transaction categorization lists based on input from multiple users whereby, when a given user of a computing system implemented financial management system modifies their own list of possible categorizations for a given financial transaction, data indicating the given user's modification of the given user's own list of possible categorizations for a given financial transaction is obtained by the computing system implemented financial management system. In one embodiment, the obtained data indicating the given user's modification of their own list of possible categorizations for a given financial transaction is then used by the computing system implemented financial management system to create and/or modify a shared list of possible categorizations for a given financial transaction. In one embodiment, the shared list of possible categorizations for a given financial transaction is then made available to, and/or used by, a community of users of the computing system implemented financial management system.

Figure 2:
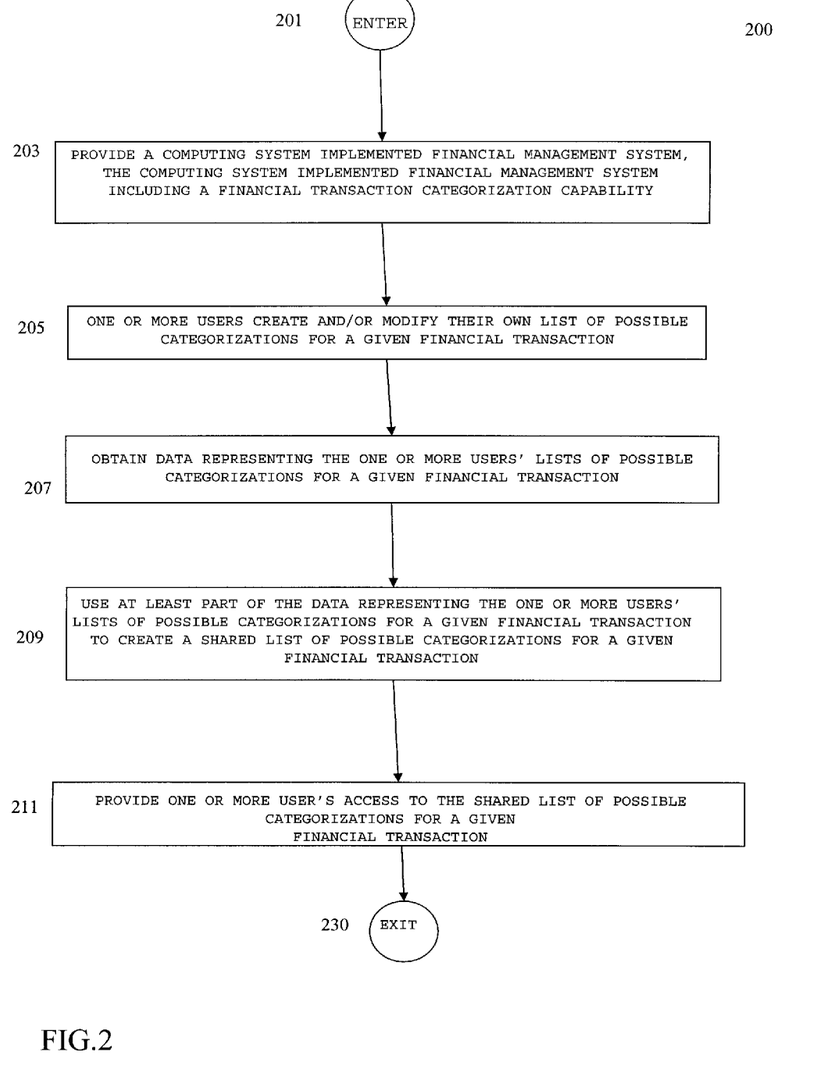
FIG. 2 is a flow chart depicting a process for modifying financial transaction categorization lists based on input from multiple users in accordance with one embodiment.

FIG. 2 is a flow chart depicting a process for modifying financial transaction categorization lists based on input from multiple users 200 in accordance with one embodiment. Process for modifying financial transaction categorization lists based on input from multiple users 200 begins at ENTER OPERATION 201 of FIG. 2 and process flow proceeds to PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 one or more users are provided access to one or more computing system implemented financial management systems, such as computing system implemented financial management system 180 and/or computing system implemented financial management system 190 (FIG. 1), that implements, includes, is accessed by, and/or is otherwise associated with process for modifying financial transaction categorization lists based on input from multiple users 200 (FIG. 2).

In various embodiments, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 are, but are not limited to: computing system implemented personal financial management systems, packages, programs, modules, or applications; computing system implemented business systems, packages, programs, modules, or applications; computing system implemented tax preparation systems, packages, programs, modules, or applications; computing system implemented financial institution management systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications; and/or various other electronic data driven data management systems, packages, programs, modules, or applications, as discussed herein, and/or as known in the art at the time of filing, and/or as developed after the time of filing.

In various embodiments, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 help users manage their finances by providing a centralized interface with banks, credit card companies, and other various financial institutions, for electronically identifying and categorizing financial transactions associated with the user. In various embodiments, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 obtain electronic transaction based data via communication with banks, credit card providers, or other financial institutions, using electronic data transfer systems such as the Open Financial Exchange (OFX) specification, or various other systems for transferring financial transaction data.

In one embodiment, the electronic transaction based data obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 includes financial transaction data associated with the one or more users that represents one or more user financial transactions conducted by a given user. In one embodiment, the financial transaction data representing various user financial transactions conducted by a given user includes, but is not limited to, data representing: dates of specific user financial transactions; payees/payers associated with specific user financial transactions; specific items purchased through specific user financial transactions; the geographic location of specific user financial transactions; the geographic location where one or more services and/or products associated with specific user financial transactions are used/delivered; and/or any other data regarding specific user financial transactions desired and/or available.

In one embodiment, at least part of the financial transaction data associated with the one or more users includes data associated with user financial transactions conducted using multiple payment methods and/or accounts to provide as complete a set of financial transaction data for a given user as possible. For instance, in one embodiment, the financial transaction data is obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a user to pay for and/or conduct user financial transactions.

In addition, in some embodiments, the financial transaction data is obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 from, multiple sources of the same type. For instance, in one embodiment, the financial transaction data associated with one or more users is obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 from, but not limited to: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a user to pay for and/or conduct user financial transactions.

In one embodiment, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 include a financial transaction categorization feature.

In some embodiments, as part of the financial transaction categorization feature, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 allow a user to manually, or semi-manually, categorize financial transactions. In some embodiments, the categorization for a given financial transaction made manually or semi-manually by a given user is used to create a given user's own list of possible categorizations for a given financial transaction, including a default categorization.

In one embodiment, as part of the financial transaction categorization feature, the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 provide an initial list of possible categorizations for a given type of financial transaction.

In one embodiment, the electronic transaction based data associated with a given financial transaction obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203, such as, but mot limited to, the payee associated with a given financial transaction, is used to identify the given financial transaction as a given type of financial transaction.

In one embodiment, the initial list of possible categorizations for a given type of financial transaction provided by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 is then associated with the given financial transaction based on the given financial transaction being of the given type of financial transaction.

In some embodiments, an initial list of possible categorizations for a given financial transaction is provided by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203, in some embodiments, based on relatively generalized data and/or parameters. For instance, in some embodiments, the initial list of possible categorizations for a given financial transaction provided by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203, is pre-defined based, at least in part, on Standard Industrial Classification (SIC) codes, or similar non-user specific mechanisms, and the electronic transaction based data associated with a given financial transaction, such as, but mot limited to, the payee associated with a given financial transaction.

In some embodiments, the initial list of possible categorizations for a given financial transaction is presented to the user by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 in the form of a pull-down menu associated with a display of the data representing a given financial transaction created through the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In some embodiments, the initial list of possible categorizations for a given financial transaction provided by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 includes two or more possible categorizations for the given financial transaction and/or a default categorization for the given financial transaction. In some embodiments, the user then selects one of the categories in the initial list of possible categorizations for the given financial transaction as the category to be applied to the given financial transaction, or the default categorization is applied.

In some embodiments, the user can modify the initial list of possible categorizations for a given financial transaction, including the default categorization, as provided by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 to create a given user's own list of possible categorizations for a given financial transaction. In some embodiments, the modified initial list of possible categorizations for a given financial transaction that becomes a given user's own list of possible categorizations for a given financial transaction is then used exclusively for the given user, at least until the user publishes his or her own list of possible categorizations for a given financial transaction as discussed below.

In some instances, the initial list of possible categorizations for a given financial transaction is modified to become the given user's own list of possible categorizations for a given financial transaction based on manual and/or semi-manual user input, such as: the user consistently selecting one of the categories in the initial list of possible categorizations for a given financial transaction as the category to be applied to a given type of financial transaction; or by the user manually adding to, and/or modifying, the initial list of possible categorizations for a given financial transaction. In some instances, the given user's own list of possible categorizations for a given financial transaction is presented to the given user in an order, and/or with a default categorization, customized to the given user's previous categorizations, and/or as determined by the frequency with which the given user historically has categorized financial transactions of the given financial transaction type, and/or similar financial transaction type.

In one embodiment, in addition to financial transaction data, the electronic transaction based data obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 also includes general financial data representing a given user's general and/or overall financial status and/or demographics, including, but not limited to: the user's occupation/profession; the status of the user as a business owner/operator or an employee; the user's marital status and/or number of dependents; the user's area of residence/zip code; the user's total assets; details regarding one or more of the user's assets, such as the size and location of the user's house and/or the type of car the user drives; the user's total income and/or the percentage of the user's income spent in a given category of financial data; the user's net worth; the user's average discretionary spending and/or the percentage of the user's discretionary spending spent in a given category of financial transaction data; the user's age group; various demographic data regarding the user and/or the user's spending; the user's commute; the user's yearly mileage; and/or any other data regarding the user's general and/or overall financial status desired and/or available to one or more of the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, as discussed below, the user's general and/or overall financial status and/or demographics data obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 is used to identify one or more user attributes associated with a given user, and to implement segmentation rules for creating filtered shared lists of possible categorizations for a given financial transaction that are based on lists of possible categorizations for a given financial transaction, and/or modifications of the lists of possible categorizations for a given financial transaction, from users' having one or more defined attributes.

In one embodiment, once one or more users are provided access to one or more computing system implemented financial management systems at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203, process flow proceeds to ONE OR MORE USERS CREATE AND/OR MODIFY THEIR OWN LIST OF POSSIBLE CATEGORIZATIONS FOR A GIVEN FINANCIAL TRANSACTION OPERATION 205.

In one embodiment, at ONE OR MORE USERS CREATE AND/OR MODIFY THEIR OWN LIST OF POSSIBLE CATEGORIZATIONS FOR A GIVEN FINANCIAL TRANSACTION OPERATION 205 one or more users of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 creates and/or modifies their own list of possible categorizations for a given financial transaction.

As discussed above, in some embodiments, as part of the financial transaction categorization feature of the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 a user is allowed to manually, or semi-manually, categorize financial transactions. In some embodiments, the categorization for a given financial transaction made manually or semi-manually by a given user is used to create a given user's own list of possible categorizations for a given financial transaction, including a default categorization. In one embodiment, at ONE OR MORE USERS CREATE AND/OR MODIFY THEIR OWN LIST OF POSSIBLE CATEGORIZATIONS FOR A GIVEN FINANCIAL TRANSACTION OPERATION 205, one or more users create their own list of possible categorizations for a given financial transaction by any of the processes discussed herein, and/or as known in the art at the time of filing, and/or as developed after the time of filing.

As discussed above, in some embodiments, as part of the financial transaction categorization feature, an initial list of possible categorizations for a given financial transaction, and/or a given type of financial transaction, is provided to the user by one or more of the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203. As also discussed above, in some embodiments, the user is provided the opportunity to modify the initial list of possible categorizations for a given financial transaction, and/or a given type of financial transaction and thereby create a given user's own list of possible categorizations for a given financial transaction. In one embodiment, at ONE OR MORE USERS CREATE AND/OR MODIFY THEIR OWN LIST OF POSSIBLE CATEGORIZATIONS FOR A GIVEN FINANCIAL TRANSACTION OPERATION 205, one or more users modify the initial list of possible categorizations for a given financial transaction, and/or a given type of financial transaction, and thereby create one or more given user's own list of possible categorizations for a given financial transaction by any of the processes discussed herein, and/or as known in the art at the time of filing, and/or as developed after the time of filing.

In one embodiment, once one or more users of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 creates and/or modifies their own list of possible categorizations for a given financial transaction at ONE OR MORE USERS CREATE AND/OR MODIFY THEIR OWN LIST OF POSSIBLE CATEGORIZATIONS FOR A GIVEN FINANCIAL TRANSACTION OPERATION 205, process flow proceeds to OBTAIN DATA REPRESENTING THE ONE OR MORE USERS' LISTS OF POSSIBLE CATEGORIZATIONS FOR A GIVEN FINANCIAL TRANSACTION OPERATION 207.

In one embodiment, at OBTAIN DATA REPRESENTING THE ONE OR MORE USERS' LISTS OF POSSIBLE CATEGORIZATIONS FOR A GIVEN FINANCIAL TRANSACTION OPERATION 207, data representing the creation and/or modification of one or more users' own lists of possible categorizations for a given financial transaction from ONE OR MORE USERS CREATE AND/OR MODIFY THEIR OWN LIST OF POSSIBLE CATEGORIZATIONS FOR A GIVEN FINANCIAL TRANSACTION OPERATION 205 is obtained by one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, the data representing the creation and/or modification of one or more users' own lists of possible categorizations for a given financial transaction is obtained by one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 through one or more of the computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, the data representing the creation and/or modification of one or more users' own lists of possible categorizations for a given financial transaction is stored in one or more databases, such as databases 170, 171 or 172 of FIG. 2, and/or in one or more computing systems, such as computing systems 100 and/or 150 of FIG. 1, and/or on one or more server systems, such as server system 120 of FIG. 1. Returning to FIG. 2, in one embodiment, the data representing the creation and/or modification of one or more users' own lists of possible categorizations for a given financial transaction is obtained by giving one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 access to the stored data.

In one embodiment, the data representing the creation and/or modification of one or more users' own lists of possible categorizations for a given financial transaction is obtained by the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 via a peer-to-peer network and/or other data sharing/access system.

In one embodiment, the data representing the creation and/or modification of one or more users' own lists of possible categorizations for a given financial transaction is obtained by the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 via a network of computing systems and/or server systems that is comprised of multiple different computers, wireless devices, cellular telephones, digital telephones, two-way pagers, personal digital assistants, server computer systems, or any desired combination of these devices, that are interconnected using a network. In some embodiments, the network can be any network or network system, such as network 130 of FIG. 1, that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in one embodiment, the data representing the creation and/or modification of one or more users' own lists of possible categorizations for a given financial transaction is obtained by the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 via any computer program product, as discussed herein, and/or known in the art at the time of filing, and/or developed after the time of filing.

Returning to FIG. 2, in one embodiment, the data representing the creation and/or modification of one or more users' own lists of possible categorizations for a given financial transaction is obtained by the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 by any method, apparatus, process or mechanism for transferring and/or accessing data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, as discussed herein, and/or known at the time of filing, and/or as developed after the time of filing.

In one embodiment, once data representing the creation and/or modification of one or more users' own lists of possible categorizations for a given financial transaction from ONE OR MORE USERS CREATE AND/OR MODIFY THEIR OWN LIST OF POSSIBLE CATEGORIZATIONS FOR A GIVEN FINANCIAL TRANSACTION OPERA- TION 205 is obtained by the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 at OBTAIN DATA REPRESENTING THE ONE OR MORE USERS' LISTS OF POSSIBLE CATEGORIZATIONS FOR A GIVEN FINANCIAL TRANSACTION OPERATION 207, process flow proceeds to USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209.

In one embodiment, at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209, at least part of the data representing the creation and/or modification of one or more users' own lists of possible categorizations for a given financial transaction obtained at OBTAIN DATA REPRESENTING THE ONE OR MORE USERS' LISTS OF POSSIBLE CATEGORIZATIONS FOR A GIVEN FINANCIAL TRANSACTION OPERATION 207 is used, at least in part, to create and/or modify a shared list of possible categorizations for a given financial transaction.

In one embodiment, at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 the shared list of possible categorizations for a given financial transaction is created according to one or more frequency and segmentation based rules. In one embodiment the one or more frequency and segmentation based rules are applied to the data representing the creation and/or modification of one or more users' own lists of possible categorizations for a given financial transaction to refine and/or customize the resulting shared list of possible categorizations for a given financial transaction.

In one embodiment, the one or more frequency and segmentation based rules of USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 include, but are not limited to, frequency rules for determining a default categorization for a given financial transaction on the shared list of possible categorizations for a given financial transaction. In one embodiment, the default categorization for a given financial transaction on the shared list of possible categorizations for a given financial transaction is selected as the most frequently applied categorization of the given financial transaction from the data representing the creation and/or modification of one or more users' own lists of possible categorizations for a given financial transaction of OBTAIN DATA REPRESENTING THE ONE OR MORE USERS' LISTS OF POSSIBLE CATEGORIZATIONS FOR A GIVEN FINANCIAL TRANSACTION OPERATION 207.

In one embodiment, the one or more frequency and segmentation based rules of USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 include, but are not limited to, frequency rules for determining the order in which one or more possible categorizations for a given financial transaction appear on the shared list of possible categorizations for a given financial transaction are presented to a user. In one embodiment, the order in which one or more possible categorizations for a given financial transaction appear on the shared list of possible categorizations for a given financial transaction is determined based on the frequency that the one or more categorizations are applied to the given financial transaction in the data representing the creation and/or modification of one or more users' own lists of possible categorizations for a given financial transaction of OBTAIN DATA REPRESENTING THE ONE OR MORE USERS' LISTS OF POSSIBLE CATEGORIZATIONS FOR A GIVEN FINANCIAL TRANSACTION OPERATION 207.

In one embodiment, the one or more frequency and segmentation based rules of USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 include, but are not limited to, segmentation rules for creating filtered shared lists of possible categorizations for a given financial transaction. In one embodiment, the filtered shared lists of possible categorizations for a given financial transaction are created based on, and/or using, data representing the creation and/or modification of one or more users' own lists of possible categorizations for a given financial transaction of OBTAIN DATA REPRESENTING THE ONE OR MORE USERS' LISTS OF POSSIBLE CATEGORIZATIONS FOR A GIVEN FINANCIAL TRANSACTION OPERATION 207 obtained from users' having one or more defined attributes.

Recall that, in one embodiment, in addition to financial transaction data, the electronic transaction based data obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 also included general financial data representing a given user's general and/or overall financial status and/or demographics, including, but not limited to: the user's occupation/profession; the status of the user as a business owner/operator or an employee; the user's marital status and/or number of dependents; the user's area of residence/zip code; the user's total assets; details regarding one or more of the user's assets, such as the size and location of the user's house and/or the type of car the user drives; the user's total income and/or the percentage of the user's income spent in a given category of financial data; the user's net worth; the user's average discretionary spending and/or the percentage of the user's discretionary spending spent in a given category of financial transaction data; the user's age group; various demographic data regarding the user and/or the user's spending; the user's commute;

the user's yearly mileage; and/or any other data regarding the user's general and/or overall financial status desired and/or available.

In one embodiment, at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 the user's general and/or overall financial status and/or demographics data obtained by the one or more computing system implemented financial management systems provided at PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 is used to identify one or more user attributes associated with a given user, and to implement segmentation rules for creating filtered shared lists of possible categorizations for a given financial transaction that are based on lists of possible categorizations for a given financial transaction, and/or modifications of the lists of possible categorizations for a given financial transaction, from users' having one or more defined attributes.

As noted above, in one embodiment, the one or more defined user attributes include, but are not limited to, one or more of the following: a defined income being associated with the user; a defined location being associated with the user; a defined profession being associated with the user; one or more defined spending habits being associated with the user; a defined marital status being associated with the user; a defined number of dependents being associated with the user; and/or any other attribute associated with a user that is typically ascertainable from the data available to one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203, as discussed herein, and/or as known in the art at the time of filing, and/or as developed after the time of filing.

In one embodiment, the one or more segmentation rules for creating filtered shared lists of possible categorizations for a given financial transaction at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 are used to provide a given user filtered shared lists of possible categorizations for a given financial transaction that are based on data from users that are most like the given user and/or have one or more attributes of importance to the given user.

In one embodiment, once at least part of the data representing the creation and/or modification of one or more users' own lists of possible categorizations for a given financial transaction obtained at OBTAIN DATA REPRESENTING THE ONE OR MORE USERS' LISTS OF POSSIBLE CATEGORIZATIONS FOR A GIVEN FINANCIAL TRANSACTION OPERATION 207 is used, at least in part, to create and/or modify a shared list of possible categorizations for a given financial transaction at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209, data representing the shared list of possible categorizations for a given financial transaction is stored.

In one embodiment, at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209, the data representing the shared list of possible categorizations for a given financial transaction is stored by, or under the control of, process for modifying financial transaction categorization lists based on input from multiple users 200. In one embodiment, the data is stored in whole, or in part, in a database maintained by, accessible by, owned by, or otherwise related to: process for modifying financial transaction categorization lists based on input from multiple users 200, and/or a provider of process for modifying financial transaction categorization lists based on input from multiple users 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in one embodiment, once at least part of the data representing the creation and/or modification of one or more users' own lists of possible categorizations for a given financial transaction obtained at OBTAIN DATA REPRESENTING THE ONE OR MORE USERS' LISTS OF POSSIBLE CATEGORIZATIONS FOR A GIVEN FINANCIAL TRANSACTION OPERATION 207 is used, at least in part, to create and/or modify a shared list of possible categorizations for a given financial transaction at USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209, process flow proceeds to PROVIDE ONE OR MORE USER'S ACCESS TO THE SHARED LIST OF POSSIBLE CATEGORIZATIONS FOR A GIVEN FINANCIAL TRANSACTION OPERATION 211.

In one embodiment, at PROVIDE ONE OR MORE USER'S ACCESS TO THE SHARED LIST OF POSSIBLE CATEGORIZATIONS FOR A GIVEN FINANCIAL TRANSACTION OPERATION 211 the data representing the shared list of possible categorizations for a given financial transaction of USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 is made available to, and/or used by, one or more users of a community of users of one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, the data representing the shared list of possible categorizations for a given financial transaction is made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 through one or more of the computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203.

In one embodiment, the data representing the shared list of possible categorizations for a given financial transaction is stored in one or more databases, such as databases 170, 171 or 172 of FIG. 2, and/or in one or more computing systems, such as computing systems 100 and/or 150 of FIG. 1, and/or on one or more server systems, such as server system 120 of FIG. 1. Returning to FIG. 2, in one embodiment, the data representing the shared list of possible categorizations for a given financial transaction is then made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 by granting the community of users access to the stored data.

In one embodiment, the data representing the shared list of possible categorizations for a given financial transaction is made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 via a peer-to-peer network and/or other data sharing/access system.

In one embodiment, the data representing the shared list of possible categorizations for a given financial transaction is made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 via a network of computing systems and/or server systems that is comprised of multiple different computers, wireless devices, cellular telephones, digital telephones, two-way pagers, personal digital assistants, server computer systems, or any desired combination of these devices, that are interconnected using a network. In some embodiments, the network can be any network or network system, such as network 130 of FIG. 1, that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in one embodiment, the data representing the shared list of possible categorizations for a given financial transaction is made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 via any computer program product, as discussed herein, and/or known in the art at the time of filing, and/or developed after the time of filing.

In one embodiment, the data representing the shared list of possible categorizations for a given financial transaction is made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211 by any method, apparatus, process or mechanism for transferring and/or accessing data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, as discussed herein, and/or known at the time of filing, and/or as developed after the time of filing.

In one embodiment, even if a given user accesses, and/or uses, all, or part, of the data representing the shared list of possible categorizations for a given financial transaction made available to the community of users at PROVIDE ONE OR MORE USER'S ACCESS TO THE SHARED LIST OF POSSIBLE CATEGORIZATIONS FOR A GIVEN FINANCIAL TRANSACTION OPERATION 211, the given user's own list of possible categorizations for a given financial transaction remains unaltered. Consequently, the user can benefit from the shared list of possible categorizations for a given financial transaction of PROVIDE ONE OR MORE USER'S ACCESS TO THE SHARED LIST OF POSSIBLE CATEGORIZATIONS FOR A GIVEN FINANCIAL TRANSACTION OPERATION 211 without losing data associated with his or her own list of possible categorizations for a given financial transaction of ONE OR MORE USERS CREATE AND/OR MODIFY THEIR OWN LIST OF POSSIBLE CATEGORIZATIONS FOR A GIVEN FINANCIAL TRANSACTION OPERATION 205.

In one embodiment, once the data representing the shared list of possible categorizations for a given financial transaction of USE AT LEAST PART OF THE DATA REPRESENTING THE ONE OR MORE USERS' LISTS OF POSSIBLE CATEGORIZATIONS FOR A GIVEN FINANCIAL TRANSACTION TO CREATE A SHARED LIST OF POSSIBLE CATEGORIZATIONS FOR A GIVEN FINANCIAL TRANSACTION OPERATION 209 is made available to, and/or used by, a community of users of one or more of the one or more computing system implemented financial management systems of PROVIDE A COMPUTING SYSTEM IMPLEMENTED FINANCIAL MANAGEMENT SYSTEM, THE COMPUTING SYSTEM IMPLEMENTED FINANCIAL MANAGEMENT SYSTEM INCLUDING A FINANCIAL TRANSACTION CATEGORIZATION CAPABILITY OPERATION 203 at PROVIDE ONE OR MORE USER'S ACCESS TO THE SHARED LIST OF POSSIBLE CATEGORIZATIONS FOR A GIVEN FINANCIAL TRANSACTION OPERATION 211, process flow proceeds to EXIT OPERATION 230.

In one embodiment, at EXIT OPERATION 230, process for modifying financial transaction categorization lists based on input from multiple users 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for modifying financial transaction categorization lists based on input from multiple users 200, the lists of possible categorizations for a given financial transaction, and/or modifications to the lists of possible categorizations for a given financial transaction, that were previously tied to a given user, and only used by the given user, are now shared, and/or used to create a shared list of possible categorizations for a given financial transaction that is accessible, and usable, by multiple users. Consequently, using process for modifying financial transaction categorization lists based on input from multiple users 200, multiple user's input is used to provide a more comprehensive list of possible categorizations for a given financial transaction, with fewer no-default category cases, and a more accurate list of possible categorizations for a given financial transaction category list.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "obtaining", "identifying", "associating", "aggregating"; "initiating"; "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted.

In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for modifying financial transaction categorization lists comprising executing via any set of one or more processors, steps comprising:
   receiving financial transaction data including financial transactions associated with respective ones of two or more parties;
   receiving respective individual lists of actual categorizations for one or more given financial transactions, each respective list of categorizations for one or more given financial transactions being associated with a different respective one of the two or more parties, and including categories that the respective parties have previously assigned various ones of the one or more given financial transactions;
   obtaining data representing two or more of the respective individual lists of categorizations for one or more given financial transactions;
   generating, using at least one of the processors of the set of processors, at least one shared list of categorizations for one or more given financial transactions, the at least one shared list of categorizations for one or more given financial transactions being based, at least in part, on the data representing the respective individual lists of categorizations for one or more given financial transactions, wherein the system is configured to be operable to produce at least one of the at least one shared list of categorizations for one or more given financial transactions as a filtered shared list of categorizations for one or more given financial transactions generated according to one or more segmentation rules,
   further wherein the one or more segmentation rules are used to generate the filtered shared list of categorizations from data obtained from parties, at least one of the parties having one or more defined attributes, and wherein data obtained from parties having one or more defined attributes is weighted more heavily than data representing at least part of one or more of the party's own lists of categorizations for one or more given financial transactions obtained from parties not having the one or more defined attributes; and
   providing at least one party data representing the shared list of categorizations for one or more given financial transactions.

2. A computer program product for providing a process for modifying financial transaction categorization lists comprising:
   a nontransitory computer readable medium;
   and computer program code, encoded on the computer readable medium, comprising computer readable instructions which, when executed via any set of one or more processors, perform:
   receiving financial transaction data including financial transactions associated with respective ones of two or more parties;
   receiving respective individual lists of actual categorizations for one or more given financial transactions, each respective list of categorizations for one or more given financial transactions being associated with a different respective one of the two or more parties, and including categories that the respective parties have previously assigned various ones of the one or more given financial transactions;
   obtaining data representing two or more of the respective individual lists of categorizations for one or more given financial transactions;
   generating at least one shared list of categorizations for one or more given financial transactions, the at least one shared list of categorizations for one or more given financial transactions being based, at least in part, on the data representing the respective individual lists of categorizations for one or more given financial transactions, wherein the system is configured to be operable to produce at least one of the at least one shared list of categorizations for one or more given financial transactions as a filtered shared list of categorizations for one or more given financial transactions generated according to one or more segmentation rules,
   further wherein the one or more segmentation rules are used to generate the filtered shared list of categorizations from data obtained from parties, at least one of the parties having one or more defined attributes, and wherein data obtained from parties having one or more defined attributes is weighted more heavily than data representing at least part of one or more of the party's own lists of categorizations for one or more given financial transactions obtained from parties not having the one or more defined attributes; and
   providing at least one party data representing the shared list of categorizations for one or more given financial transactions.

* * * * *